(12) United States Patent
Geller et al.

(10) Patent No.: US 6,733,569 B2
(45) Date of Patent: May 11, 2004

(54) METHOD AND APPARATUS FOR SEPARATING MIXTURES OF GASES USING AN ACOUSTIC WAVE

(75) Inventors: Drew A. Geller, Los Alamos, NM (US); Gregory W. Swift, Santa Fe, NM (US); Scott N. Backhaus, Espanola, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 10/238,250

(22) Filed: Sep. 10, 2002

(65) Prior Publication Data

US 2003/0192427 A1 Oct. 16, 2003

Related U.S. Application Data

(63) Continuation-in-part of application No. 10/121,395, filed on Apr. 12, 2002, now abandoned.

(51) Int. Cl.$^7$ ................................................ B01N 51/08
(52) U.S. Cl. ............................................ 95/29; 96/389
(58) Field of Search .......................... 95/29, 31; 96/389

(56) References Cited

U.S. PATENT DOCUMENTS

| 3,109,721 A | 11/1963 | Zenner et al. ................. 95/29 |
| 5,985,001 A | 11/1999 | Garrett et al. ................. 95/29 |

OTHER PUBLICATIONS

McGuire, Nancy K; "The Latest Buzz on Gas Separation"; Today's Chemist At Work; American Chemical Society; Dec. 2002.*

Geller et al; "Separation of Gas Mixture by Thermoacoustic Waves"; Los Alamos National Laboratory, Los Alamos NM 87545; Undated.*

Swift and Spoor, "Thermal Diffusion and Mixture Separation in the Acoustic Boundary Layer", J. Acoust. Soc. Am. 106 (4) , Pt. 1, Oct. 1999.

Spoor and Swift, "Thermoacoustic Separation of a He–Ar Mixture", Physical Review Letters, vol. 85, No. 8, Aug. 21, 2000.

* cited by examiner

*Primary Examiner*—Richard L. Chiesa
(74) *Attorney, Agent, or Firm*—Ray G. Wilson

(57) ABSTRACT

A thermoacoustic device separates a mixture of gases. An elongated duct is provided with first and second ends and has a length that is greater than the wavelength of sound in the mixture of gases at a selected frequency, and a diameter that is greater than a thermal penetration depth in the mixture of gases. A first acoustic source is located at the first end of the duct to generate acoustic power at the selected frequency. A plurality of side branch acoustic sources are spaced along the length of the duct and are configured to introduce acoustic power into the mixture of gases so that a first gas is concentrated at the first end of the duct and a second gas is concentrated at the second end of the duct.

12 Claims, 6 Drawing Sheets

METHOD AND APPARATUS FOR SEPARATING MIXTURES OF GASES USING AN ACOUSTIC WAVE

RELATED APPLICATIONS

This application is a CIP of U.S. patent application Ser. No. 10/121,395, filed Apr. 12, 2002 now abandoned.

STATEMENT REGARDING FEDERAL RIGHTS

This invention was made with government support under Contract No. W7405-ENG-36 awarded by the U.S. Department of Energy. The government has certain rights in the invention.

FIELD OF THE INVENTION

The present invention relates generally to the separation of gaseous mixtures, and, more particularly, to the separation of gaseous mixtures using acoustic waves.

BACKGROUND OF THE INVENTION

The spectrum of practical applications requiring separation of mixtures is broad, including large-scale industrial processes such as petroleum refining, air separation, and beverage processing, and smaller-scale processes such as isotope separation and chemical analysis. A large number of "physical" (i.e., not chemical) mixture-separation techniques are well understood and in widespread use, including time-independent thermal diffusion, gaseous diffusion, fractional distillation, centrifugation, electromagnetic separation, and chromatography.

Of these, distillation is the most widely used in the large-scale petroleum refining and air separation industries, and large distillation plants have efficiencies approaching half the efficiency limit imposed by the laws of thermodynamics. However, many mixtures cannot be practically separated by distillation, usually because the components of such mixtures have equal or nearly equal boiling points. Mixtures of isotopes or mixtures of isomers must usually be separated by less efficient, non-distillation methods, such as time-independent thermal diffusion using Clusius-Dickel columns. When the two components of the mixture have nearly identical densities, however, the gravity-dependent aspects of Clusius-Dickel columns fail, and even more awkward and/or inefficient separation methods must be used.

Even with this broad spectrum of existing methods, some separations are still difficult or impossible, for reasons such as instability of the mixture's molecules at elevated temperature, exact equality of the components' densities, freezing of the mixture at reduced temperatures, and safety considerations demanding low mixture inventory.

Swift et al., "Thermal diffusion and mixture separation in the acoustic boundary layer," 106 J. Acoust. Soc. Am. 4, Pt 1, pp. 1794–1800 (1999) reports a mixture separation method based on thermoacoustic phenomena. The separation mechanism results from two simultaneous interactions of a sound wave in a gas with a solid boundary aligned parallel to the sound-propagation direction. A thin layer of the gas mixture adjacent to the solid boundary is immobilized by viscosity while the rest of the gas mixture moves back and forth with the sound wave. The heat capacity of the solid boundary holds this thin layer of the gas mixture at constant temperature while the rest of the gas mixture experiences oscillations in temperature due to the oscillating pressure of the sound wave.

The oscillating temperature and attendant oscillating thermal diffusion cause the two components of the gas mixture to take turns diffusing into and out of the immobilized layer, so that the oscillating motion of the sound wave outside the immobilized layer tends to carry gas enriched in one component in one direction and gas enriched in the other component in the opposite direction. This is like a bucket brigade: the sound wave corresponds to the people in the brigade, each of whom lifts a bucket full of the first component out of the immobilized layer, moves it in one direction, pours it back in the immobilized layer, fills his/her bucket with the second component there, moves back in the other direction, pours the second component into the immobilized layer, and refills with the first component to repeat the cycle. Experiments and theory described in Swift et al. supra, and Spoor et al., "Thermoacoustic Separation of a He—Ar Mixture," 85 Phys. Rev. Lett. 8, pp. 1646–1649 (2000) demonstrate that this mechanism is occurring. The present invention is directed to a practical method and apparatus to employ this mechanism for challenging separations such as isotopes or isomers. Thermoacoustic mixture separation has several advantages over various previous separation methods used for isotopes, isomers, or other difficult cases. It does not require gravity or differences in densities of the two components of the mixture, it can operate entirely at ambient temperature (or at any other single temperature), the inventory of mixture is small, and the hardware is simple and reliable.

Various features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is directed to a thermoacoustic device for separating a mixture of gases. An elongated duct is provided with first and second ends and has a length that is greater than the wavelength of sound in the mixture of gases at a selected frequency, and a diameter that is greater than a thermal penetration depth in the mixture of gases at the selected frequency. A first acoustic source is located at the first end of the duct to generate acoustic power at the selected frequency. A plurality of side branch acoustic sources are spaced along the length of the duct and configured to introduce acoustic power into the mixture of gases in the duct so that a first gas in the mixture of gases is concentrated at the first end of the duct and a second gas in the mixture of gases is concentrated at the second end of the duct.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

Figure 1:
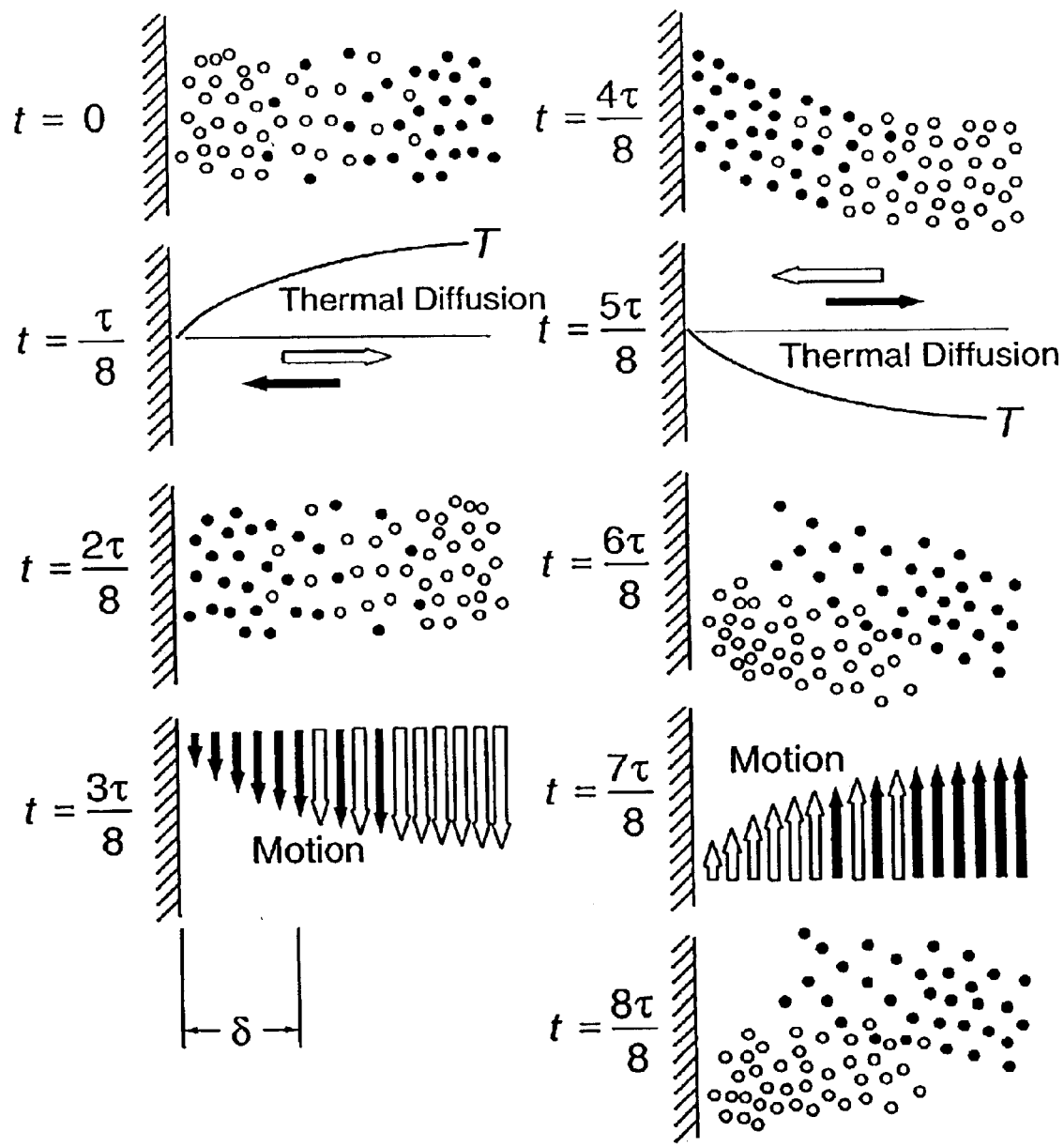
FIG. 1 pictorially represents separation of a gaseous mixture with acoustic waves.

The physical mechanism behind thermoacoustic mixture separation is explained in detail in Swift et al., supra, and Spoor et al., supra, and is illustrated in FIG. 1. FIG. 1 pictorially shows a simplified view of the interplay between thermal diffusion and viscosity in the acoustic boundary layer, producing spatial separation of the components of a gas mixture. The small, open circles represent light molecules, and the larger, filled ones represent heavy molecules.

FIG. 1 shows the history of such molecules near one location through a full cycle of an acoustic wave, comprising a temporal sequence of high pressure and temperature, downward motion, low pressure and temperature, and upward motion. The wave, actually sinusoidal, is crudely represented by four idealized discrete steps in FIG. 1. The period of the oscillation is $\tau$, temperature is T, and velocity is u. At times near $t=\tau/8$ and $5\tau/8$, the pressure wave is at an extremum, and the particle velocity is zero. The gas far from the solid boundary experiences adiabatic compression or rarefaction, and is therefore heated or cooled relative to the solid boundary, which is isothermal by virtue of the high heat capacity of the solid.

A temperature gradient extends over a distance $\delta_k = \sqrt{k/\pi f \rho c_p}$ in the gas, (thereinafter, "thermal penetration depth"), where k is the thermal conductivity of the mixture of gases, $f=1/\tau$ is the frequency of the acoustic wave, $\rho$ is the density of the mixture of gases, and $c_p$ is the isobaric specific heat of the mixture. Thermal diffusion causes the heavy component to diffuse toward the wall and the light component to diffuse away from the wall near time $\tau/8$ and vice versa near time $5\tau/8$ (directions may be reversed for some gas mixtures), with the components diffusing a distance on the order of $\delta_D = \sqrt{D_{12}/\pi f}$, where $D_{12}$ is the binary mass diffusion coefficient, i.e., the coefficient that relates how quickly two components in a mixture relax toward spatially uniform concentrations in the absence of other effects. Near times $3\tau/8$ and $7\tau/8$, the pressure is near its mean value and the temperature is spatially uniform, but the velocity is nonzero, with a gradient near the wall extending over a distance of order $\delta_v = \sqrt{\mu/\pi f \rho}$, where $\mu$ is the viscosity. In the cycle illustrated, the net effect is that light-enriched gas outside the viscous boundary layer moves downward near time $3\tau/8$ while heavy-enriched gas is trapped inside the viscous boundary layer, and vice versa near time $7\tau/8$, resulting in net fluxes of the heavy component upward and the light component downward.

Figure 2:
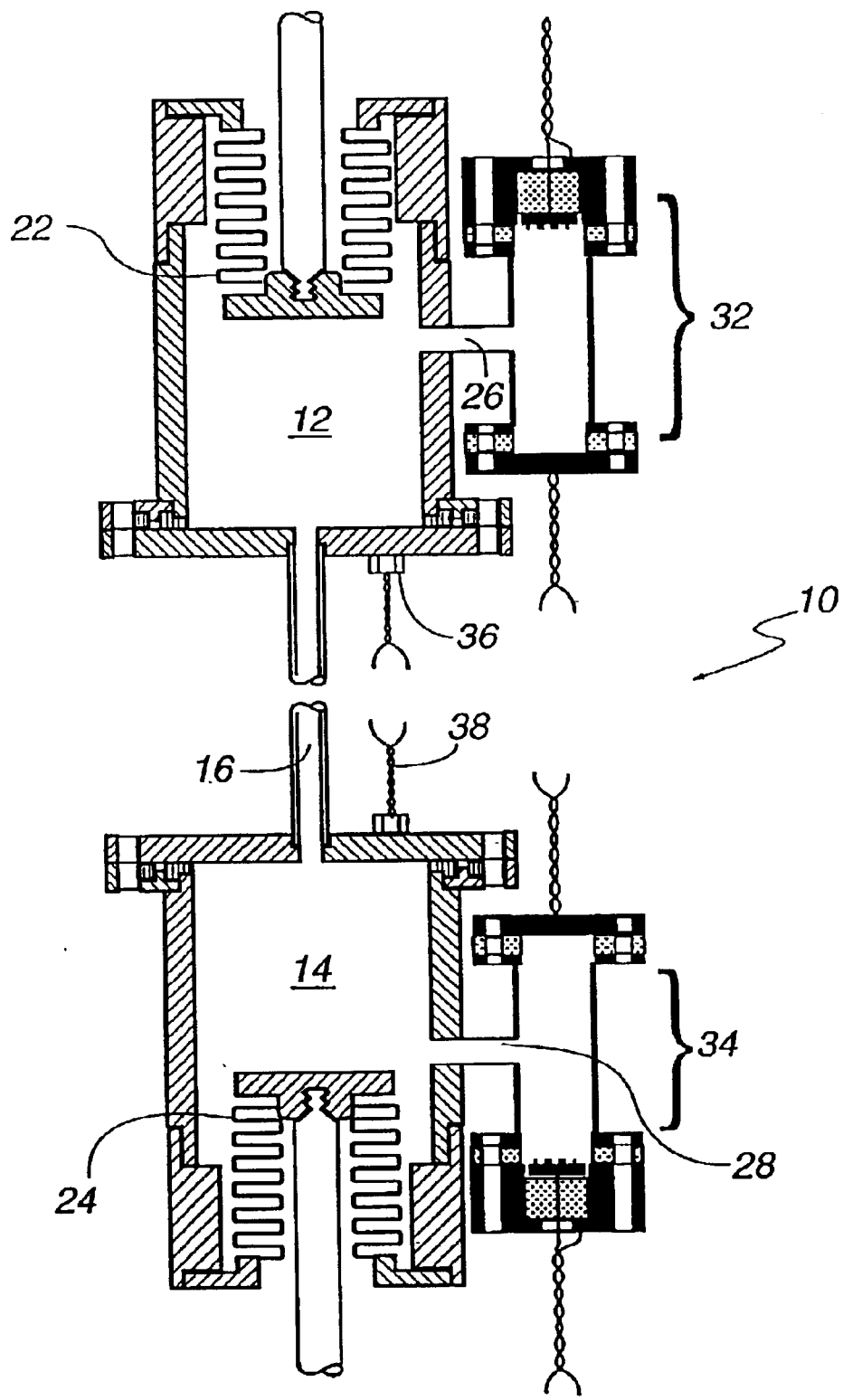
FIG. 2 schematically depicts experimental apparatus for separating a gaseous mixture with acoustic waves.

FIG. 2 shows apparatus 10 described in Spoor et al., supra, to explore this phenomenon and test for quantitative agreement with theory. Two reservoirs 12, 14 of volume 125 cm$^3$ were connected by a narrow duct 16 in which the separation occurred, with the separation mechanism illustrated in FIG. 1 occurring along the inside wall of duct 16. As used herein, a "duct" is a tubular passage that preferably has a circular cross-section, but may have other regular cross sections, such as rectangular. For a non-circular duct, "diameter" herein means the hydraulic diameter, equal to four times the cross-sectional area of the duct divided by its perimeter. The whole was filled with an initially uniform 50/50 molar mixture of helium and argon at mean pressure of 80 kPa absolute. Each reservoir 12, 14 had a bellows-sealed piston 22, 24 driven by linear motors (not shown), and side branches 26, 28 on each reservoir led to respective acoustic gas analyzers 32, 34.

Independent phase and amplitude control of the two motor-driven pistons 22, 24 allowed great variety in the resulting waves produced in separation duct 16. The frequency $f=1/\tau$ of piston oscillations 22, 24 was low enough (<20 Hz) that the length of separation duct 16 was much shorter than a wavelength, so the gas oscillations can at first be thought of as essentially uniform along the length of duct 16. This was desirable for quantitative comparison of these early experiments with theory, but is not desirable for practical mixture separation because the degree of separation achievable in such a short duct is limited. Sensors 36, 38 in each reservoir 12, 14 detected the amplitude and phase of the oscillating pressure in each reservoir 12, 14, which were used with known values of the gas density and viscosity and the dimensions of separation duct 16 to calculate the amplitudes of pressure p and volume flow rate U, and the phase difference $\theta$ by which p led U, in the middle of duct 16.

Each acoustic analyzer 32, 34 was an acoustically excited cylindrical cavity used to detect the local proportions of the helium and argon. The lowest resonance frequency (approximately 4 kHz) in the cylindrical cavity was a/2L, where a is the sound speed and L is the cavity length. The sound speed is in turn related to the molar weight m of the mixture by $a^2 = \gamma RT/m$, where $\gamma$ is the ratio of isobaric to isochoric specific heats, R is the universal gas constant, and T is the mean absolute temperature. Mole fraction was thus easily obtained from measurement of resonance frequency and gas temperature of analyzers 32, 34.

Theoretical efforts have been confirmed by measurements with the apparatus shown in FIG. 2. The theory is described in Geller et al., "Saturation of thermoacoustic mixture separation," J. Acoust. Soc. Am., Vol. 111, pages 1675–1684, April 2002, incorporated herein by reference. The theory gives the separation flux along the axis of a duct as a function of the concentration gradient along the duct axis, the duct geometry, the properties of the gas mixture, and the frequency, amplitudes, and phases of the acoustic wave. Further theoretical analysis is presented in Geller et al., "Thermodynamic efficiency of thermoacoustic mixture separation," J. Acoust. Soc. Am., Vol. 112, pages 504–510, August 2002, incorporated herein by reference.

Some of the important aspects of the theory are:

1. The duct diameter should be larger than $\delta_k$.

2. The separation flux along the duct axis is approximately proportional to the square of the amplitude of the oscillations.

3. The separation flux and the saturation concentration gradient are approximately proportional to the thermal diffusion coefficient of the gas mixture.

4. There is an optimum temporal phasing between oscillating pressure and oscillating velocity.

5. The separation flux decreases as the concentration gradient rises.

6. The concentration difference that can be maintained increases with the axial distance along the duct over which the aforementioned acoustic conditions can be maintained.

7. The energy efficiency of the process is typically of the same order of magnitude as that of gaseous diffusion and of time-independent thermal diffusion.

Figure 3:
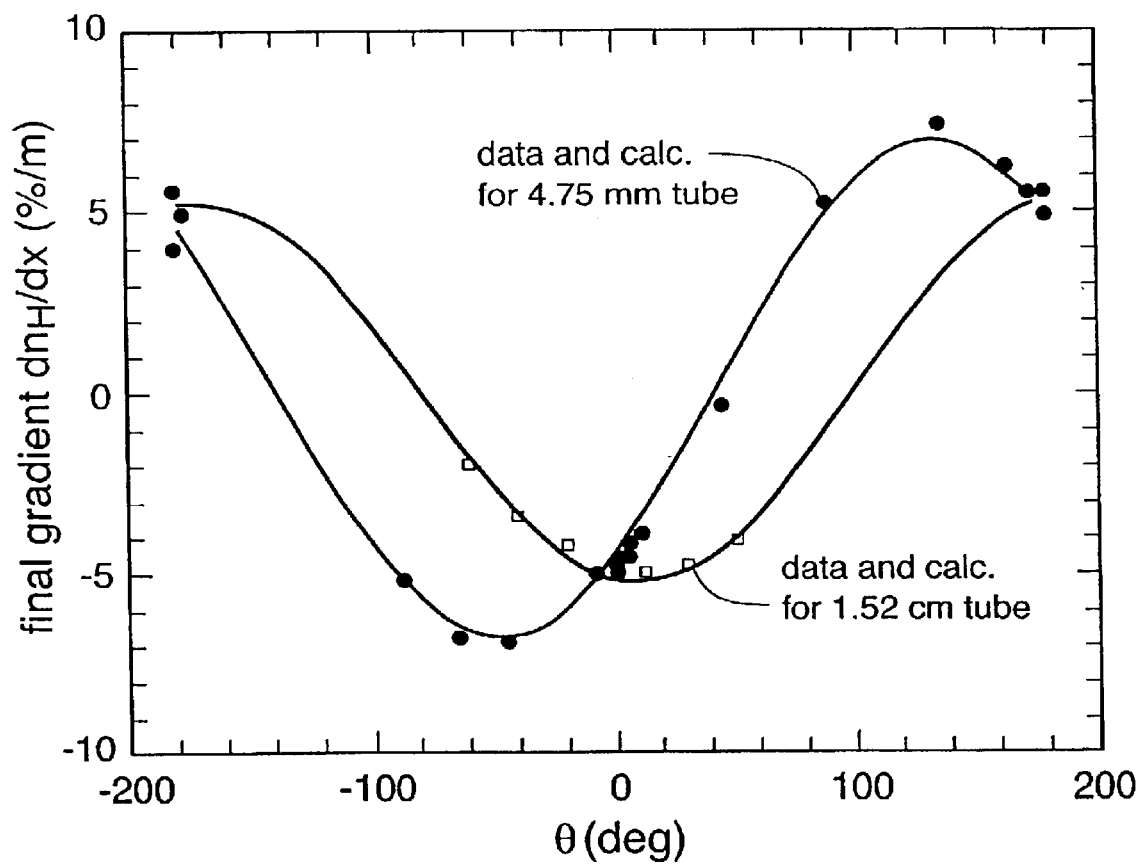
FIG. 3 graphically depicts theoretical vs. experimental performance of the device shown in FIG. 2.
Figure 4:
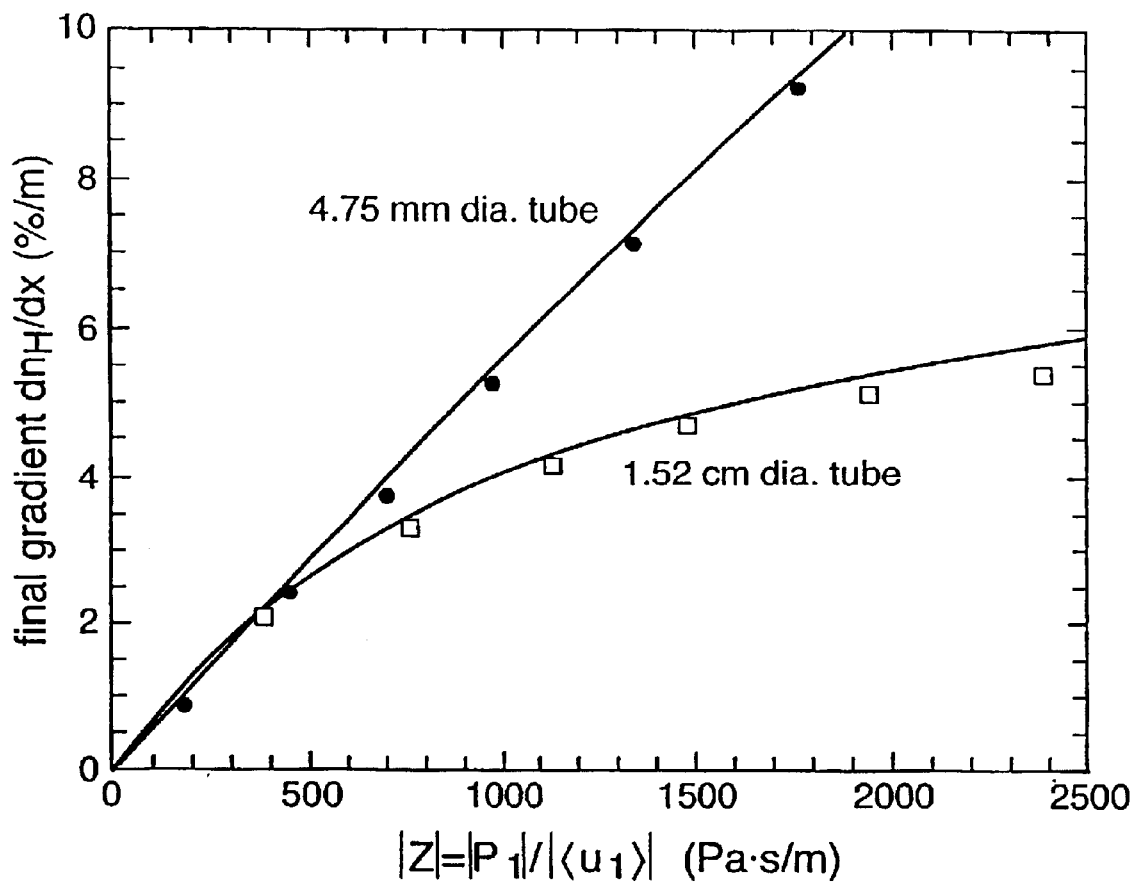
FIG. 4 graphically depicts further comparisons of theoretical vs. experimental performance of the device shown in FIG. 2.

The excellent agreement between measurements and theory is illustrated in FIGS. 3 and 4. FIG. 3 shows the saturation concentration gradient in the duct vs. the temporal phasing θ between the pressure and velocity oscillations. FIG. 4 shows the same saturation concentration gradient vs. the ratio of amplitudes of pressure and velocity. The points are experimental results, and the lines are calculations using the equations described in Geller et al., J. Acoust. Soc. Am., Vol. 111, supra. The excellent agreement between the measurements and the theory in these figures confirms the accuracy of the theory.

Mixtures that are difficult to separate by prior-art means have small thermal diffusion coefficients, so the thermoacoustic separation flux and saturation concentration gradient are small. Hence, significant concentration differences can only be achieved in long ducts, preferably many acoustic wavelengths long. Maintaining the optimal acoustic pressure amplitude, optimal velocity amplitude, and optimal temporal phasing therebetween in a duct having such a long length is a challenging acoustics problem. This problem is exacerbated because the duct should not have too large a diameter; otherwise axial diffusion and streaming act strongly to re-mix the separated components. A small diameter duct causes severe attenuation of the acoustic wave in such a long duct.

Figure 5:
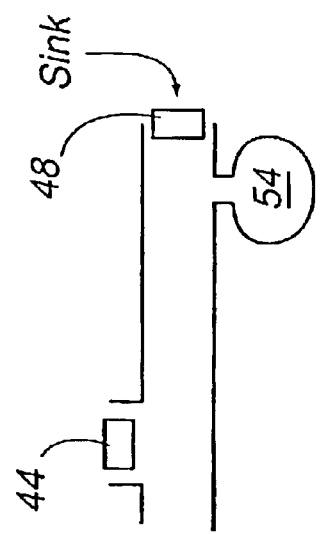
FIG. 5 schematically depicts a batch separator according to one embodiment of the present invention.
Figure 5:
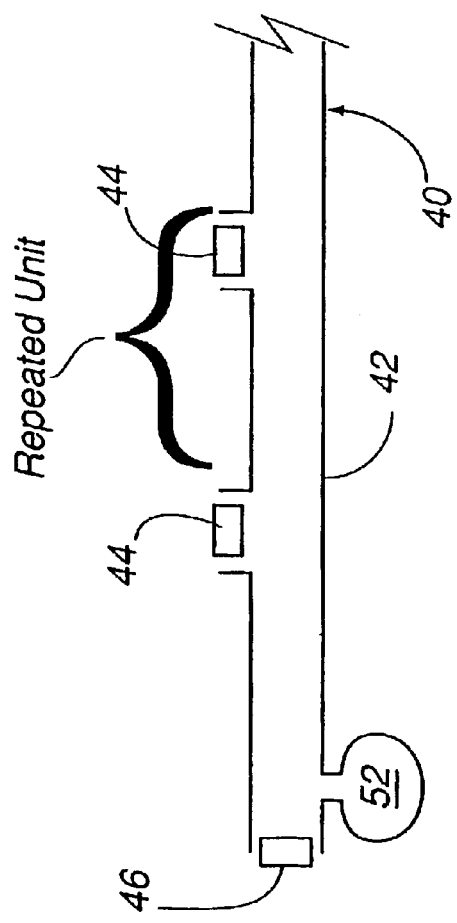
Figure 6:
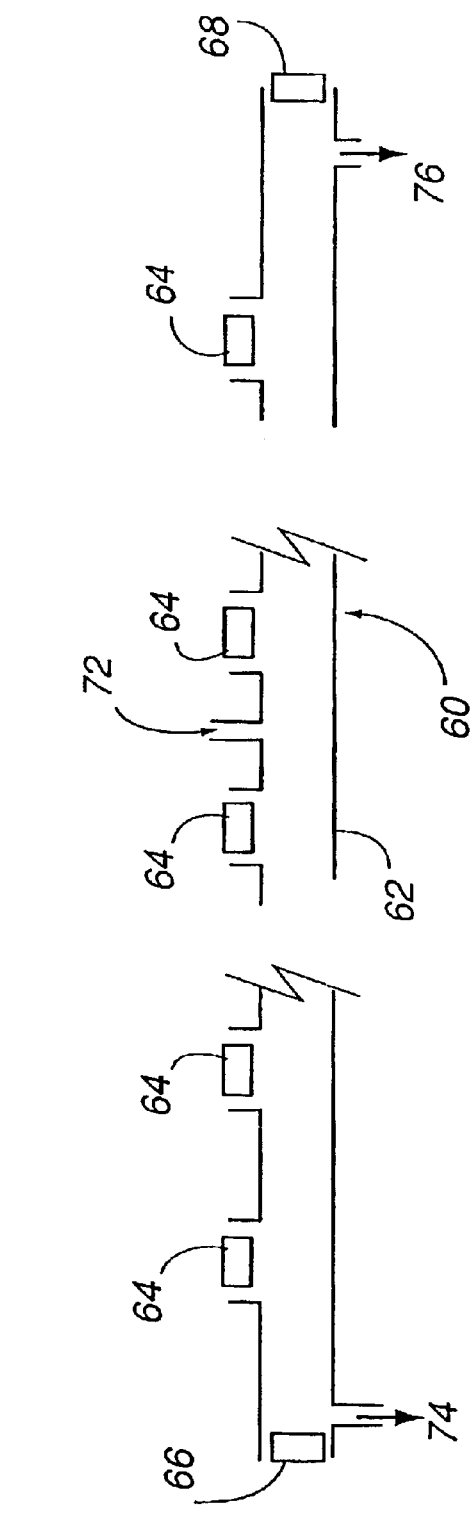
FIG. 6 schematically depicts a continuous separator according to one embodiment of the present invention.

In accordance with the present invention, the easy-to-build thermoacoustic mixture separators shown in FIG. 5 or 6 maintain sufficiently favorable acoustic conditions throughout a duct of arbitrarily long length. FIG. 5 shows a thermoacoustic mixture separator 40 for batch separations, and FIG. 6 shows a thermoacoustic mixture separator 60 for continuous-flow separations. The time phasing between oscillating pressure and oscillating velocity (with positive velocity defined to the right in FIGS. 5 and 6) is close to zero degrees, which is close to the theoretical optimum phasing. The ducts 42, 62 have lengths of at least one acoustic wavelength and diameters between one and ten thermal penetration depths, so attenuation of the acoustic wave will be severe and the desired amplitudes can only be maintained along the lengths of the ducts by means of side-branch sources that add acoustic power along the ducts. The main source 46, 66 and side-branch sources 44, 64 can be any of a number of types of sound sources, including linear-motor-driven pistons (possibly sealed by bellows as shown in FIG. 2), loudspeakers, and thermoacoustic engines. The sink 48, 68 can be any absorber of sound including a linear-alternator-coupled piston (possibly sealed by bellows), a loudspeaker, a thermoacoustic refrigerator, a second stage of thermoacoustic mixture separator, or a resistive acoustic impedance such as a wad of steel wool stuffed into the duct.

The theory imposes no constraints on the operating frequency of the device, so a variety of practical considerations can be considered for choosing the operating frequency. Efficiency, convenience, cost, and reliability of the sources of sound will often be the most important criteria for choosing the operating frequency. Convenience of duct diameter and duct-wall smoothness will also affect choice of frequency. The theory shows that the duct 42, 62 diameter should be greater than a thermal penetration depth, so that too low a frequency would lead to a large duct diameter, which might be impractical if it is desired to coil a long duct into a circular coil. The theory also shows that turbulence within the thermal penetration depth should be avoided, so the roughness of the duct inner wall must be much smaller than the thermal penetration depth. Hence, too high a frequency would place impractical demands on the smoothness of the duct inner wall.

Avoidance of turbulence also limits the velocity amplitude. The amplitude of the velocity in the duct should be chosen to be as high as possible, but without encountering turbulence anywhere in the duct (except necessarily near the side-branch sources, where the side-branch geometry will cause local turbulence).

The theory suggests that the temporal phasing θ affording maximum separation is in the vicinity of zero degrees and depends on the diameter of the duct and on the mixture being separated. For example, FIG. 3 shows optimum values of θ of −45 degrees and +12 degrees for the small- and large-diameter ducts, respectively, in a 50—50 He—Ar mixture, and intermediate diameter ducts have intermediate optimum values of θ. The equations of acoustics prevent the phasing from being chosen arbitrarily in a long duct driven by a plurality of side-branch sources, but, fortunately, the phasing will typically be close to—but less than—zero in the duct between side branch sources. Hence, the diameter of the duct can be chosen to set the optimum value of θ close to zero degrees in order to optimize the separation per unit length of duct.

After the frequency, velocity, and diameter have been chosen according to the considerations in the previous paragraphs, the ratio of the amplitudes of the oscillating pressure and the oscillating velocity must be chosen. This ratio is selected by the choice of the distance between the side-branch sources and by adjustment of the temporal phase differences between the side-branch sources, as described below.

There are two classes of suitable choices for this ratio. In the first class, the ratio is chosen to be ρa, where a is the speed of sound in the mixture of gases, even though the theory shows that a higher ratio is typically optimum for separation. By this choice, the wave in the duct is substantially that of a rightward (source to sink) traveling acoustic wave. Those skilled in the art of acoustics know that such a wave can be created by motion of the main source 46, 66 at the left end of the duct, maintained against dissipation by motion of the side-branch sources 44, 64 with equal amplitudes and with relative temporal phase differences equal to the temporal phase evolutions experienced by the wave as it travels through duct 42, 62 from one side-branch source to the next, and finally absorbed by sink 48, 68 at the right end of the duct.

For the batch separator shown in FIG. 5, elongated duct 42 is initially filled with a gas mixture and reservoirs 52 and 54 are connected adjacent the ends of duct 42 for collecting the separated gases. For the continuous separator shown in FIG. 6, gas inlet 72 is placed intermediate the ends of duct 62 to introduce a mixture of gases within duct 62. Gas outlets 74 and 76 are connected adjacent the ends of duct 62 to remove separated gases from duct 62.

In one preferred embodiment, the side-branch sources 44, 64 are equally spaced by one-quarter of the acoustic wavelength along the duct. This spacing ensures that the large number of sources necessary for duct 42, 62 with a length equal to a large number of wavelengths need be driven at only 4 different relative temporal phases: 0°, 90°, 180°, and 270°. If these are electrically driven sound sources such as loudspeakers or linear motors, then the electronics that create the electrical signals must create only a first oscillating voltage and a second oscillating voltage 90° out of phase from the first; signals at 180° and 270° can then be derived simply by reversing the polarity of the wiring connections to selected individual sources.

Figure 7:
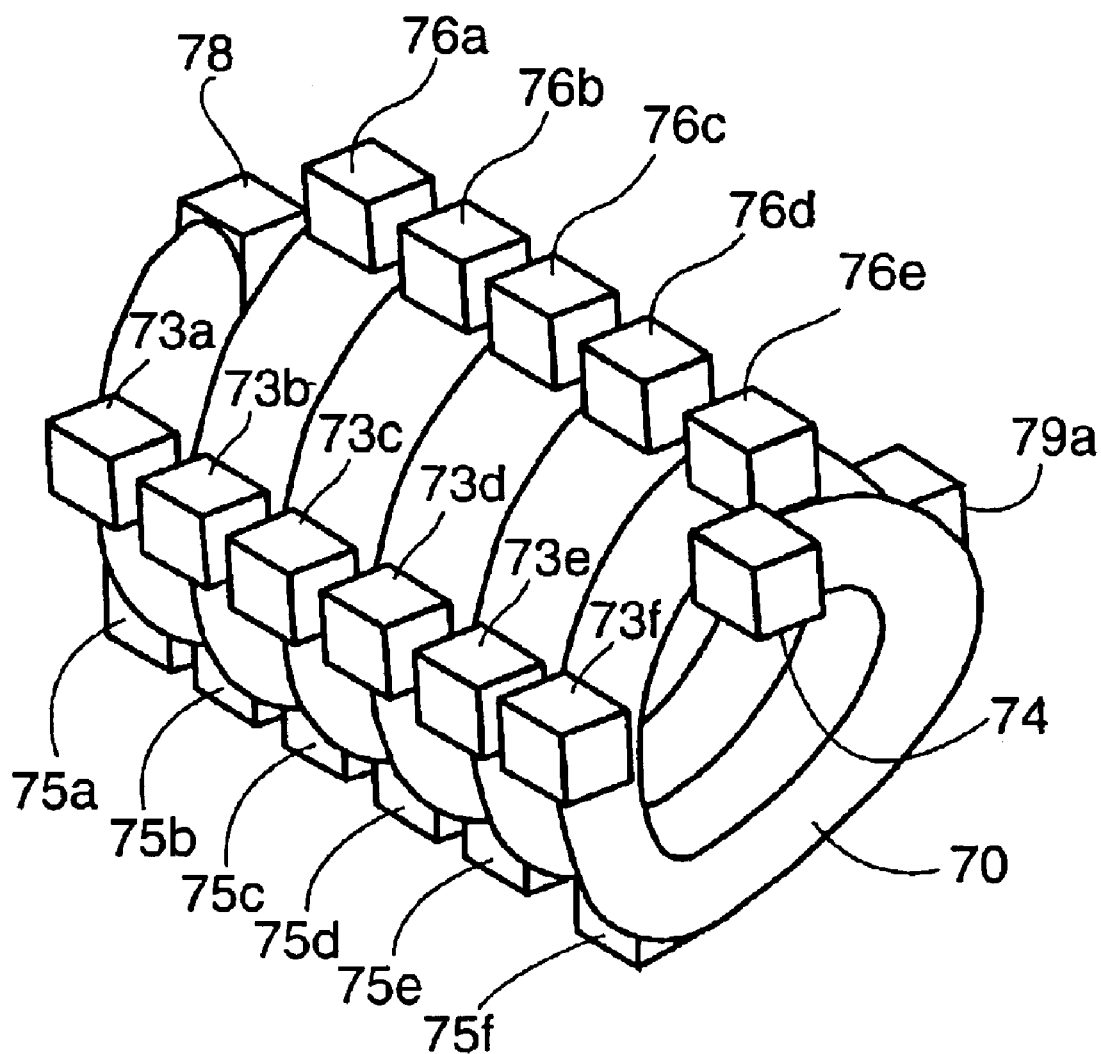
FIG. 7 pictorially depicts a coiled version of either of the devices shown in FIG. 5 or 6.

In another embodiment shown in FIG. 7, duct 70 is coiled into a circular coil or folded into a square coil with one wavelength of sound per turn with acoustic source 74 and acoustic sink 78 located at ends of duct 70. One plurality of acoustic sources, shown as 76a–e, are spaced one wavelength apart along the duct to locate the sources in a row that can conveniently be mechanically driven by a common driver (not shown). A second plurality of acoustic sources 73a–f are also spaced one wavelength apart from one another, and are spaced a quarter wavelength from sources 76a–e, and can conveniently be mechanically driven by a common driver (not shown). A third plurality of sources 75a–f and a fourth plurality of sources 79a–f are arranged similarly to complete the configuration. The apparatus shown in FIG. 7 may be either a batch separation device or a continuous separation device with provisions for collecting separated gases as described in FIGS. 5 and 6, respectively.

In the second class of choice for the ratio of oscillating pressure to oscillating velocity, the ratio is chosen to be greater than ρa. This higher value provides greater separation flux or greater saturation concentration gradient along the duct or both. For example, when using the theory of Geller et al., J. Acoust. Soc. Am., Vol. 111, supra, in a numerical analysis to consider various design options for a neon isotope separator, it was found that setting this ratio to 3ρa (instead of ρa as for the first class, above) and increasing the number of side-branch sources per unit length by 1.6 provided three times more separation flux and a 1.6 times steeper concentration gradient. However, the acoustic engineering necessary to maintain such a wave, along a duct whose length is greater than a wavelength, is more complicated than that in the first class acoustics for generating these higher ratios can be described as an admixture of rightward and leftward traveling waves that are generally not simple reflections of one another—i.e., the sum is not a standing wave.

Whereas, for the case of a single rightward traveling wave described above, the ratio and temporal phase between oscillating pressure and velocity is constant over arbitrarily long lengths of duct between side-branch sources, neither the ratio nor the phase can be held fixed when the mixture of rightward and leftward traveling waves is used. Instead, the combination of waves produces the nearly zero phase and the maximum ratio of oscillating pressure to velocity midway between the side branches. The choice of distance between side-branch sources can then be made based on a trade-off between short distance, which keeps the entire duct closest to the desired phase and ratio, and long distance, which reduces the number of side-branch sources required. Again, it will prove convenient to choose the time phase shift between adjacent side-branch sources to be evenly divisible into 360°, such as 90°, 60°, or 45°, so that only a few electronic signals are required to drive all the acoustic sources.

This second class of thermoacoustic separation devices has the added benefit of lowering the velocity, and therefore the risk of turbulence, in the middle of the segments where the separation mechanism will be most effective.

Finally, after choosing the frequency, velocity amplitude, temporal phase shift, and ratio of oscillating pressure to oscillating velocity as described above, the overall length of the duct can be chosen to achieve a desired degree of separation. The longer the duct, the purer will be the gases at the two ends. To achieve high purity in difficult separations, the chosen overall length could reach hundreds, or even thousands, of wavelengths.

A simple realization of the separation method according to the present invention has been embodied by a prototype machine to separate the isotopes of Neon. Naturally occurring Neon consists of 90.48% Ne-20, 0.27% Ne-21, and 9.25% Ne-22, and Neon 20/22 should be one of the easiest isotope pairs to separate. This separator is of the first class of machines described above, using a traveling wave to separate the atoms. The acoustic waveguide consists of stainless steel tubing of 0.132" internal diameter, which is a standard size available from any tubing supplier. Tube segments between side branches are 16.5" long, the segment from the main source to the first side branch is 27.8" long, and the segment from the last side branch to the sink is 10.7" long. The electroacoustic sources for the ends and for the branches are similar, each consisting of a sealed 1" diameter, 0.74" long Nickel bellows, driven along its axis by a Radio Shack model 40-1032 loudspeaker. The hermetic system is charged with 99.9995% pure Neon at room temperature and 80 kPa, which is approximately local atmospheric pressure at Los Alamos National Laboratory.

The concentration of isotopes is measured at either end of the apparatus as a function of time using a Stanford Research Systems model RGA100 residual gas analyzer, which is a type of wide band mass spectrometer. Because the residual gas analyzer functions only in high vacuum environments, the test gas is sampled through a 5 micron diameter capillary leak of 2 cm length. The apparatus consists of the 2 end sources and 3 side branch sources arrayed in a straight path, so that the whole apparatus is about 7' long. Because the system is modular, extra side branches and segments can be added readily at any time. Initial operation of this apparatus with a uniform gas mixture of Ne-22 provided a concentration of 9.55% at the main source and 8.95% at the sink end.

A numerical model was used in designing the apparatus, based on DeltaE, a program that is widely used for design and evaluation in thermoacoustics.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A thermoacoustic device far separating a mixture of gases comprising
an elongated duct having first and second ends and hewing a length that is greater than the wavelength of sound in the mixture of gases at a selected frequency, and having a diameter that is greater than a thermal penetration depth in the mixture of gases at the selected frequency;
a first acoustic source at the first end of the duct to generate acoustic power at the selected frequency; and
a plurality of side branch acoustic sources spaced along the length of the duct and configured to introduce acoustic power into the mixture of gases in the duct so that a first gas in the mixture of gases is concentrated at the first end of the duct and a second gas in the mixture of gases is concentrated at the second end of the duct.

2. The thermoacoustic device of claim 1, wherein the plurality of side branch acoustic sources comprise periodically spaced individual side branch acoustic sources.

3. The thermoacoustic device of claim 2, wherein the individual adjacent side branch acoustic sources are spaced apart to provide temporal phase differences of 90° between me adjacent side branch acoustic sources.

4. The thermoacoustic device of claim 1, wherein each side branch acoustic source of the plurality of side branch acoustic sources produces identical oscillation amplitudes in the mixture of gases.

5. The thermoacoustic device of claim 1, further including a first reservoir adjacent the first end of the duct for collecting a first gas from the mixture of gases and a second reservoir adjacent the second end for collecting a second gas from the mixture of gases.

6. The thermoacoustic device of claim 1, further including a gas inlet connected intermediate of the first and second ends for introducing the mixture of gases within the elongated duct, a first gas outlet connected adjacent the first end of the duct, and a second gas outlet connected adjacent the second end of the duct.

7. The thermoacoustic device of claim 1, wherein the elongated duct is coiled with each coil having a length of one wavelength at the selected frequency and the side branch acoustic sources are located along the coiled elongated duct.

8. A method for separating gases from a mixture of gases comprising:

establishing an acoustic wave at a selected frequency within an elongated duct that contains the mixture of gases;

the elongated duct having first and second ends, a length that is greater than the wavelength of sound in the mixture of gases at the selected frequency and a diameter that is greater than a thermal penetration depth in the mixture of gases at the selected frequency;

introducing acoustic power at a plurality of side branches spaced along the elongated duct; and collecting separated gases adjacent the first and second ends of the elongated duct.

9. The method of claim 8, inducting establishing a temporal phasing between osculating pressure and oscillating velocity of the mixture of gases that approaches zero degrees.

10. The method of claim 8, including spacing the plurality of side branches at equal distances along the elongated duct to provide a temporal phase difference of 90° between adjacent side branches under selected operating conditions.

11. The method of claim 9, including establishing a ratio of oscillating pressure to oscillating velocity of about $\rho a$ where $\rho$ is the density of the mixture of gases and a is the speed of sound in the mixture of gases.

12. The method of claim 9, including establishing a ratio of oscillating pressure to oscillating velocity greater than $\rho a$, where $\rho$ is the density of the mixture of gases and a is the speed of sound in the mixture of gases.

* * * * *